United States Patent [19]

Aldrich

[11] Patent Number: 5,016,961
[45] Date of Patent: May 21, 1991

[54] OPTICAL APPARATUS FOR ELECTRICALLY INTER-COUPLING ROTATING AND STATIONARY DEVICES

[75] Inventor: William N. Aldrich, Redwood City, Calif.

[73] Assignee: Ampex Corporation, Redwood City, Calif.

[21] Appl. No.: 450,895

[22] Filed: Dec. 14, 1989

[51] Int. Cl.⁵ .............................................. G02B 6/28
[52] U.S. Cl. .............................. 350/96.15; 350/96.2; 250/551
[58] Field of Search ....................... 350/96.20, 96.15; 250/551

[56] References Cited

U.S. PATENT DOCUMENTS

| | | | |
|---|---|---|---|
| 2,659,563 | 11/1953 | Saxe | 249/14 |
| 2,806,402 | 9/1957 | Ferris | 88/14 |
| 3,619,612 | 11/1971 | Belke | 250/88.3 H |
| 4,027,945 | 6/1977 | Iverson | 350/96 C |
| 4,060,725 | 11/1977 | Hoshika | 250/227 |
| 4,109,997 | 8/1978 | Iverson | 350/23 |
| 4,109,998 | 8/1978 | Iverson | 350/23 |
| 4,117,460 | 9/1978 | Walworth | 340/190 |
| 4,401,365 | 8/1983 | Mizokawa et al. | 350/96.2 |
| 4,436,367 | 3/1984 | Lewis et al. | 350/96.20 |
| 4,447,114 | 5/1984 | Koene | 350/96.2 |
| 4,472,052 | 9/1984 | Löfgren | 356/44 |
| 4,492,427 | 1/1985 | Lewis et al. | 350/96.20 |

Primary Examiner—John D. Lee
Assistant Examiner—Stephen W. Barns
Attorney, Agent, or Firm—George B. Almeida

[57] ABSTRACT

Transmission of one or more electrical signals from a rotatable to a stationary member is provided along one or more channels, with an array of optical emitters positioned in a circle concentric with the axis of rotation of the rotatable member. A concentric array of facing optical detectors on the stationary member is coaxially spaced from the emitters. As the rotatable member is rotated, the optical detectors are sequentially switched in sync with the corresponding rotation of the respective emitter which is transmitting the signal. The direction of transmission may be reversed by reversing the location of the emitters and detectors to the stationary and rotatable members, respectively. In an alternate configuration, a concentric cylindrical embodiment with a cylindrical surface having emitters or detectors thereon rotates within a concentric stationary cylindrical surface having a circular configuration of facing detectors or emitters, respectively, thereon.

17 Claims, 6 Drawing Sheets

OPTICAL APPARATUS FOR ELECTRICALLY INTER-COUPLING ROTATING AND STATIONARY DEVICES

BACKGROUND OF THE INVENTION

The invention relates to the transmission of electrical signals between a stationary portion and a complimentary moving portion of various electromechanical devices. More particularly, the invention relates to an electro-optical non-contacting coupling apparatus for transferring one or more electrical signals between rotating and stationary devices.

Typically, electrical and light signals have been transferred between moving and stationary parts of devices by means of various apparatus which include, for example, slip rings, rotary transformers and/or fiber optic bundles. However, all these coupling apparatus are subject to various undesirable disadvantages, particularly when used in sophisticated, very high speed applications such as, for example, helical scanner systems in video tape recorders.

To illustrate, slip rings are subject to wear, particularly in very high speed rotary devices. Slip rings further are prone to the generation of electrical noises and have cooling problems.

Rotary transformers are non-linear, have no response to a DC component, and are complex and expensive devices which are difficult to package and fabricate, particularly in a rotating head configuration such as used, for example, in the video tape recorders of previous mention. That is, while rotary transformers solve some of the problems of slip ring devices, they require considerable electrical power to function properly, and are subject to signal attenuation. For example, they can induce signal distortions since they rely upon the transmission of electromagnetic energy across an air gap between their rotating and stationary parts, wherein the air gap and thus the transmission can be influenced by adjacent magnetic materials. Signal attenuation also is caused by the mediocre bandwidth characteristics of the rotary transformer, whose response starts to roll-off prematurely to signal roll-off. In addition, in an application having many data channels, the complexity and bulkiness of rotary transformers would prohibit their use.

Typical fiber optic bundle electro-optical devices also are difficult to package and fabricate and have not successfully been used to date in precision, high speed environments such as tape recorder rotating head apparatus.

SUMMARY OF THE INVENTION

The present invention overcomes the shortcomings of the prior art of previous mention, by reducing the coupling apparatus size and complexity, and by providing DC coupling of the signal from the rotating device to the stationary electronics, while further eliminating the fabrication difficulties associated with rotary transformers and fiber optic bundle devices. In addition, the present optical coupling apparatus has very large bandwidth characteristics with no premature roll-off at high frequencies. The present electro-optical configuration further is particularly advantageous in an environment where many channels of data are being transmitted between stationary and rotating devices, since it is readily adaptable to advanced electronic packaging technology as well as printed circuit board technology. However, the present optical coupling technique is equally applicable to the transmission of a signal over a single channel as well.

To this end, the invention includes a stationary member and a rotatable member with respective facing flat circular surfaces, or facing concentric cylindrical surfaces. In embodiments of the invention wherein signals are transmitted bi-directionally, both the stationary and rotatable members each include optical emitters and optical detectors, such that when the signal is transmitted in a first direction, emitters on the rotatable member for example, supply a signal to detectors on the stationary member and the detectors are switched to provide electrical rotation. In such an embodiment, when the signal is transmitted in the opposite direction, emitters are located on the stationary member with the detectors on the rotatable member, and the emitters are switched. It follows that, in applications where signals are transmitted in one direction, the stationary and rotatable members each are provided with either at least one optical emitter, or at least one optical detector only, depending upon the direction of signal transmission and the number of channels in the system.

More particularly, in a first two channel embodiment for use, for example, in the record mode of a video tape recorder, an array of optical emitters are positioned along a selected circumference on the flat surface of the stationary member, which flat surface, in turn, faces a flat surface of a rotatable member. In addition, the stationary member, and particularly the circle of optical emitters, are coaxially arranged about an extension of the axis of rotation of the rotatable member. The rotatable member may be, for example, a part of the rotating heads structure of a video tape recorder scanner assembly. In this first embodiment, the number of emitters generally is greater than the number of data channels to be transmitted. A concentric plurality of optical detectors (for example, two in this two channel implementation), are secured to the flat surface of the rotatable member in concentric relation to the circle of emitters on the stationary member. The stationary member is co-axially spaced from the rotatable member to define a fixed circular axial gap between the optical emitters and detectors thereof. The rotatable member and thus the detectors, are rotated together with the rotating heads. In general, and in this first embodiment, the number of optical detectors is equal to the number of transmitted data channels. Thus, in a two channel system, two signals may be simultaneously transmitted to two respective detectors via the complementary emitters in a concentric circle on the stationary member.

A plurality of electronic switches are coupled to, or are integral with, the respective optical emitters and detectors which are supported on the stationary member, and are consecutively enabled and disabled to sequentially switch the circle of emitters or detectors. This provides in effect corresponding electrical rotation of the optical emitters or detectors on the stationary member, in synchronism with the speed of rotation of the rotatable member. If two signals are transmitted via two channels, the first signal is emitted by an emitter which is located diametrically opposed to the emitter which transmits the second signal. Thus, in a first direction of signal transmission corresponding to the first embodiment of previous mention, as the member and thus the optical detectors are rotated, selected diametrically opposing optical emitters are successively switched on and off in sync with the selected rotating optical detector of the corresponding channel. Thus the incoming signals of the channels are successively switched to respective emitters which are partially and fully in facing registration with their respective rotating detectors. Thus, for example, a field of video supplied in a Type C format video tape recorder, may be switched through a full concentric circle of emitters on the stationary member, during a full rotation of the respective detector, and thus during the corresponding single scan of a recording head along a helical track across the tape.

In a second embodiment having a pair of signal channels, and an opposite direction of signal transmission, as when a tape recorder is in a playback mode, the optical detectors are located on the stationary member, and a pair of optical emitters are disposed to rotate on the rotatable member. The two channels of signals now are transmitted from the rotatable member via the two emitters thereon, to the plurality of detectors disposed on the stationary member, by selectively enabling the detectors via the electronic switches of previous mention, in synchronism with the rotation of the emitters on the rotatable member.

In a practical implementation of a bi-directional signal transmission system of, for example, two data channels, a pair of diametrically opposed emitters, and a pair of diametrically opposed detectors, are disposed at respective different circumferences on the rotatable flat member. The stationary member supports a plurality of concentric detectors at a circumference equal to that of the rotatable emitters, and also supports a plurality of concentric emitters secured thereto at a circumference equal to that of the rotatable detectors. Thus signals may be transmitted bidirectionally (even simultaneously) with the same rotatable and stationary member assembly.

Although the invention combination is described herein by way of example only in an environment of a two channel signal coupling device for a video tape recorder, the concepts readily are applicable to other types of apparatus of one or more channels wherein electrical signals are transmitted from rotating to stationary apparatus. For example, the coupling apparatus may be used in the collection of strain data in a jet turbine environment, wherein there is need to transmit a large amount of data from a rotating to a stationary member. A corresponding re-arrangement of the cooperating emitter and detector configurations, sizes and electrical specifications, in conjunction with the rotatable and stationary member requirements, is generally required and would be apparent to one skilled in the art given the description herein of various exempliary embodiments.

DESCRIPTION OF THE PREFERRED EMBODIMENTS

For purposes of description, the invention combination is described here in the environment of video tape recorders, and particularly as used in a two head, two channel, helical scanner device therein, wherein a recording process provides signal transmission from a stationary to a rotating member, and a playback process provides the opposite direction of signal transmission from the rotating to the stationary member. In this exemplary environment, the optical coupler of the invention provides a preferred apparatus for transmitting the electrical record and playback signals between the rotating heads and the signal processing electronics of the recorder. However, it is to be understood that the invention combination is equally applicable to other environments wherein it is desirable to transmit electrical signals between, for example, a rotating device and a stationary device. In addition, one or more channels may be employed to transmit a corresponding number of signals.

Figure 1:
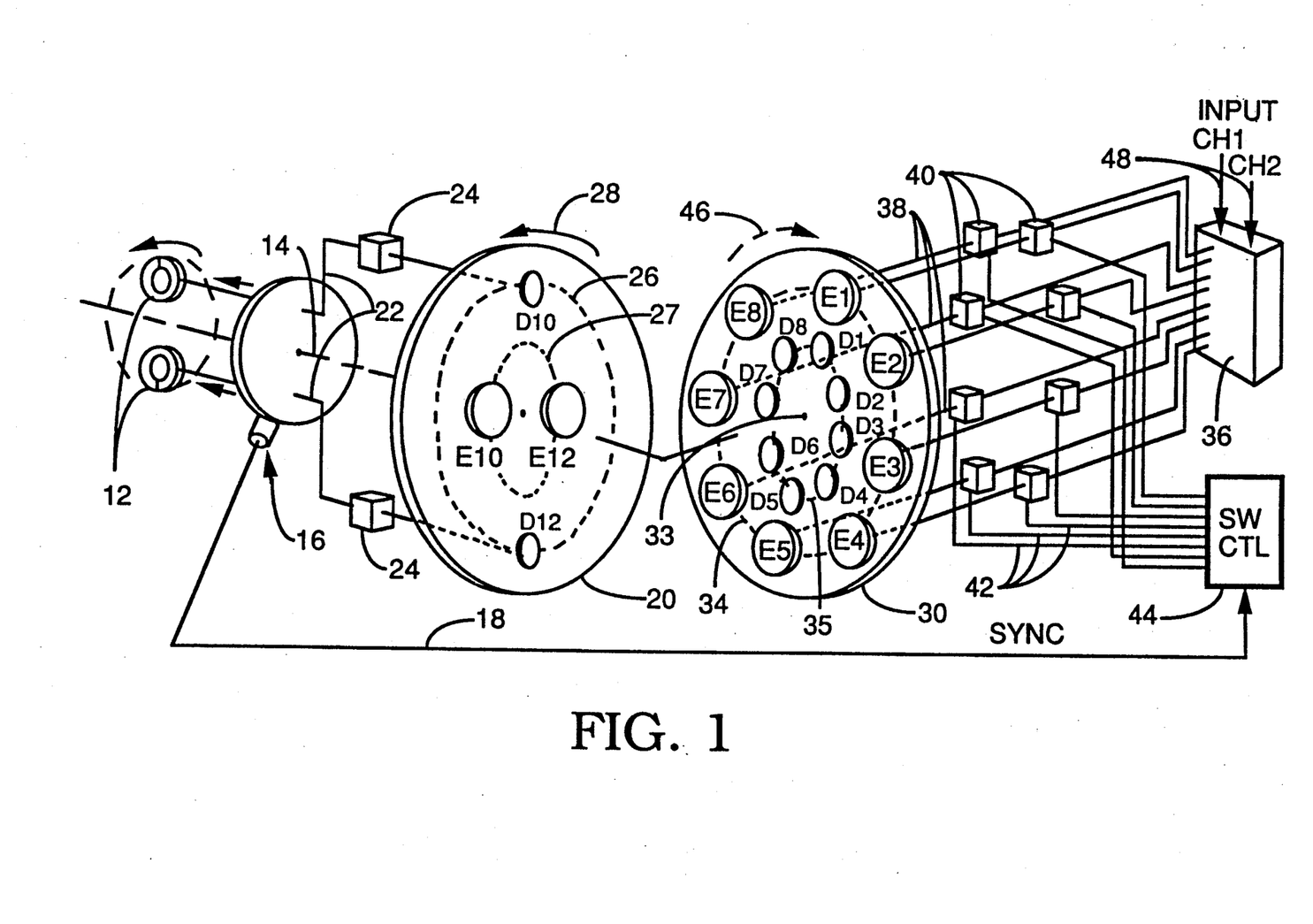
FIGS. 1 and 2 are perspective views of respective embodiments of the present invention, embodying a two channel system by way of example only.

More particularly, in FIG. 1 a pair of helical record heads 12 are secured for rotation about an axis 14, as conventionally used in a video tape recorder when providing a record mode of operation. A tachometer 16 is secured for rotation with the heads, and includes a sensor for supplying a timing signal on a sync line 18, in the form of tach pulses indicative of the speed and location of head rotation. A rotatable member 20 formed, for example, of a flat disk of suitable material, also is mechanically secured to the heads 12 and tachometer 16 for coaxial rotation therewith. The signals to be recorded herein are supplied to the heads 12 via two channels which include respective lines 22 and respective flying record amplifiers 24. In accordance with the invention, the amplifiers 24 are coupled to respective optical detectors D10, D12 which are secured to the rotatable member 20 in a diametrically opposed configuration about the axis 14, and on a common circumference 26. The optical detectors D10, D12 may be low noise, high bandwidth photodetectors such as conventionally used to convert a light signal into an electrical signal. The photodetectors may be operated in a reverse bias mode, for example. As shown, the detectors D10, D12 thus rotate about the axis 14 on a preselected common radius corresponding to the circumference 26. As shown here via an arrow 28, the rotatable member 20 may be rotated counter clockwise with the rotation of the heads 12.

Figure 4A:
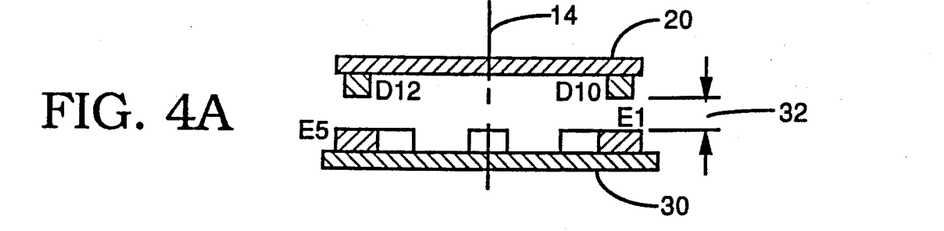
FIGS. 4A, 4B are sectional views taken along section lines 4A—4A and 4B—4B of FIGS. 3A and 3C, respectively.
Figure 4B:
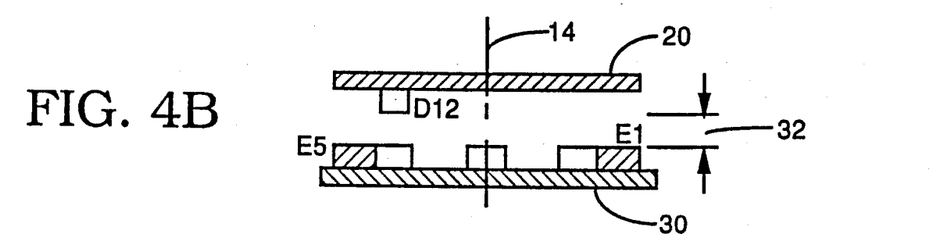

In accordance with the invention, a stationary member 30 is disposed with a flat surface facing the flat surface of the rotatable member 20, with a preselected circular spacing or gap 32 therebetween as illustrated more clearly in FIGS. 4A, 4B. The gap 32 actually is the circular axial spacing between the optical detectors D10, D12 and a plurality of concentrically arranged optical emitters E1, E2 ... E8 located on the stationary member 30 along a circumference 34 whose radius about a point 33 coaxial with axis 14, is the same as that of the circumference 26. Thus, detectors D10, D12, when rotated about the axis 14, describe a circular path which is in register with the facing plurality of concentric emitters E1-E8. Although eight emitters are depicted herein by way of example only, any plurality of emitters may be used. For example, in an environment of dozens of channels, dozens of detectors and hundreds of emitters may be employed utilizing, for example, advanced electronic packaging technology.

The emitters may be very low capacity light emitting diodes (LED's), or preferably laser diodes since the latter have a greater light dispersion in one plane than in the other. That is, laser diodes generate a non-symmetrical light beam pattern whereby the diode can be arranged with the wider dispersion angle aligned with the direction of rotation. The wide dispersion allows the light from successive emitters to overlap thereby increasing the efficiency of light detection by the detectors.

The emitters E1-E8 are connected to a matrix circuit 36, herein containing two channels, via respective lines 38. Electronic switches 40 are inserted in respective lines 38 and are enabled and disabled by respective control signals on lines 42 extending to the switches 40 from a switching control circuit 44. The switches 40 in effect enable the emitters E1-E8 in preselected numbers and order, as controlled by the circuit 44 and the timing signal on the sync line 18 of previous mention. The timing signal, in turn, is indicative of the rotation of the heads 12 in conjunction with the rotatable member 20. The switches 40 are sequentially enabled by the switching control circuit 44 in the clockwise direction, as shown by dashed arrow 46, in sync with the rotatable member 20. The emitters E1-E8 are enabled in sync with the rotation of the detectors D10, D12 to provide thereto, two channels of continuous optical signals representative of two input signals. In this example, the matrix circuit 36 includes two channels 1 and 2, which supply two input signals on lines 48 which are the signals to be recorded onto tape via the invention optical coupler apparatus and the heads 12.

Figure 2:
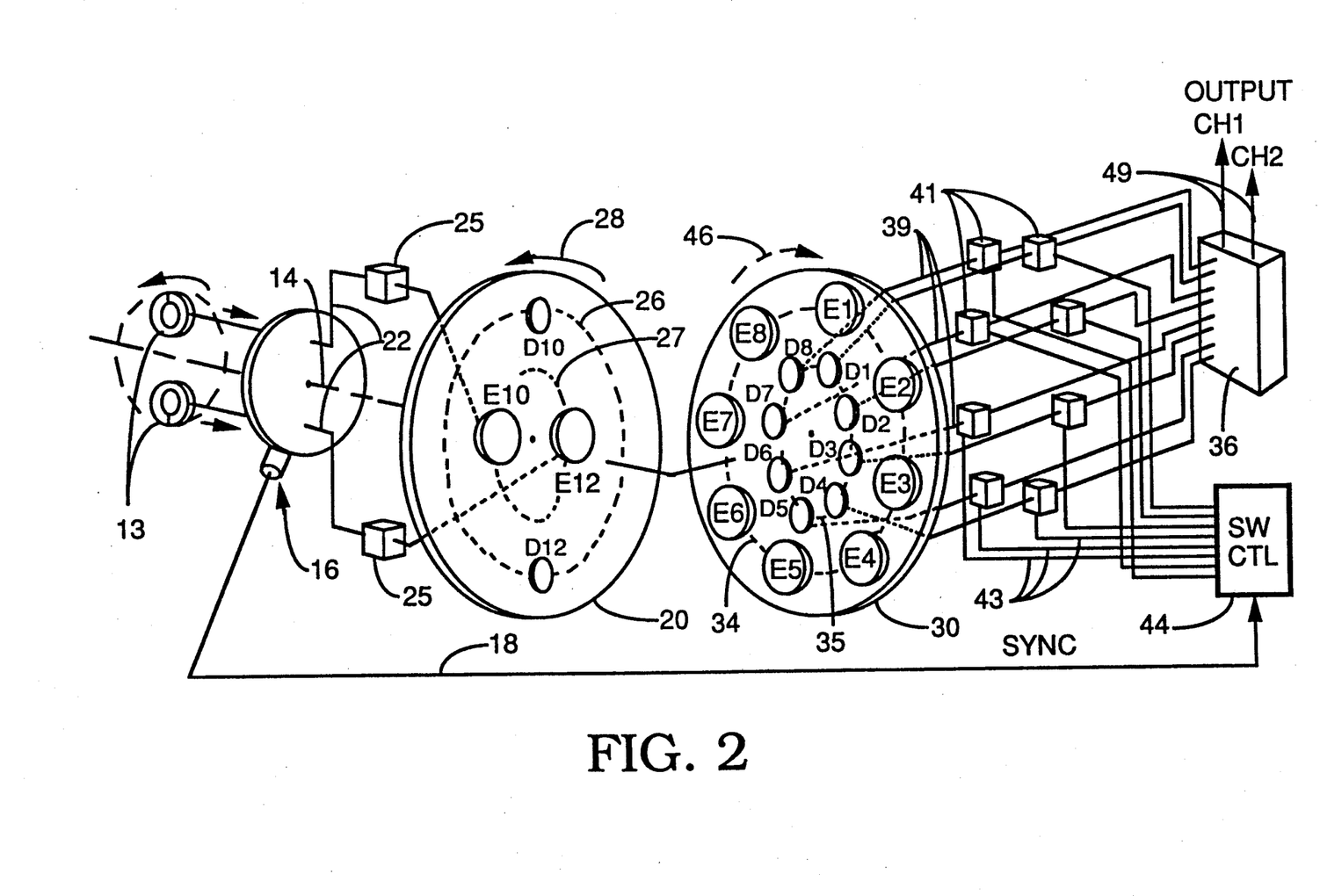

FIG. 2 illustrates the invention combination with signals being transmitted from the rotating member 20 to the stationary member 30, for example, as occurs in a video tape recorder environment when operating in the playback mode. Like components are similarly numbered in FIGS. 1 and 2. In such a playback mode of operation, the signal flow direction is reversed, and the scanning process for the optical emitters and detectors is reversed accordingly. That is, the optical detectors D1-D8 are electronically switched via their respective switches 41 to stay in sync with the rotating emitters E10, E12, in the manner previously described for the configuration of FIG. 1. To this end, heads 13 now are playback heads for reading out the magnetic history recorded on a tape. The off-tape signals are supplied to respective optical emitters E10, E12 concentrically disposed on the flat surface of the rotatable member 20 at a circumference 27 thereon which is different in radius than the circumference 26 of the optical detectors D10, D12. A playback amplifier 25 is inserted in each line 23 of the two channels, to amplify the playback signals in conventional fashion.

A concentric circle of optical detectors D1-D8 is coaxially disposed on the flat surface of the stationary member 30, along a circumference 35 which has a radius equal to that of the circumference 27 of the emitters E10, E12. In this example, the circumference 35 of the detectors D1-D8 lies inside the circumference 34 of the emitters E1-E8. Lines 39 extending from the detectors D1-D8 are coupled to respective electronic switches 41, as previously depicted for the emitters E1-E8 in FIG. 1, and thence are coupled to the matrix circuit 36 in the manner illustrated in FIG. 10. The matrix circuit 36 provides a pair of output signals on lines 49 corresponding to respective channels 1 and 2. The switches 41 are enabled and disabled by control signals supplied from the switching control circuit 44 via control lines 43, as described in FIG. 1. The tachometer 16 provides the control circuit 44 with the tach pulses via sync line 18, which are indicative of the member 20 rotation and which control the switching of the detectors D1-D8 on the stationary member 30.

It may be desirable to employ lens means such as a cylindrical lens secured, for example, to the emitter, to obtain the optimum dispersion of light from the emitters to the detectors, and thus the most uniform detector light input and thus electrical signal output as the emitters and detectors rotate past each other. A cylindrical lens is preferable as it disperses light in one plane only, as preferred here. Such a light lensing arrangement is exemplified in FIGS. 7, 8 in conjunction with the cylindrical member embodiment, but can also be similarly employed in the circular member embodiment of FIGS. 1-4. Obviously, a lens could be used with the optical detector instead, or in combination with the lens 56 on the emitter.

Figure 3A:
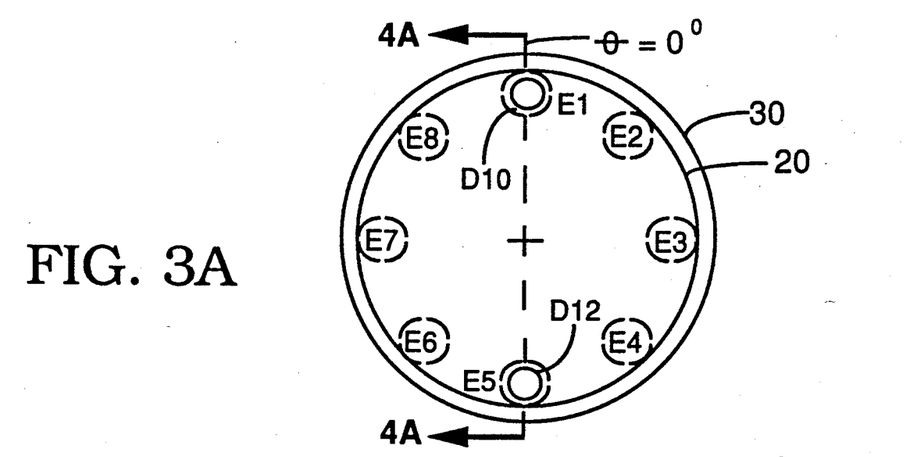
FIGS. 3A-3C are plan views exemplifying the angular relationships between the optical detector and emitter arrays as may be used, for example, in the embodiments of FIGS. 1, 2, as the rotatable member rotates.
Figure 3B:
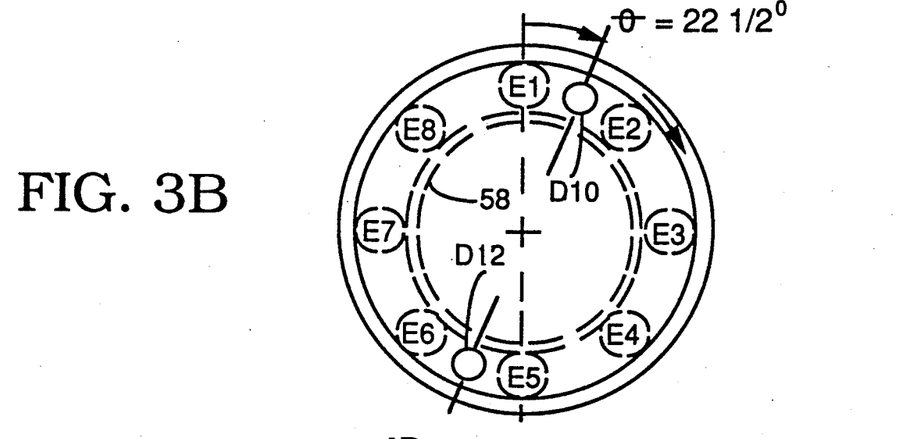
Figure 3C:
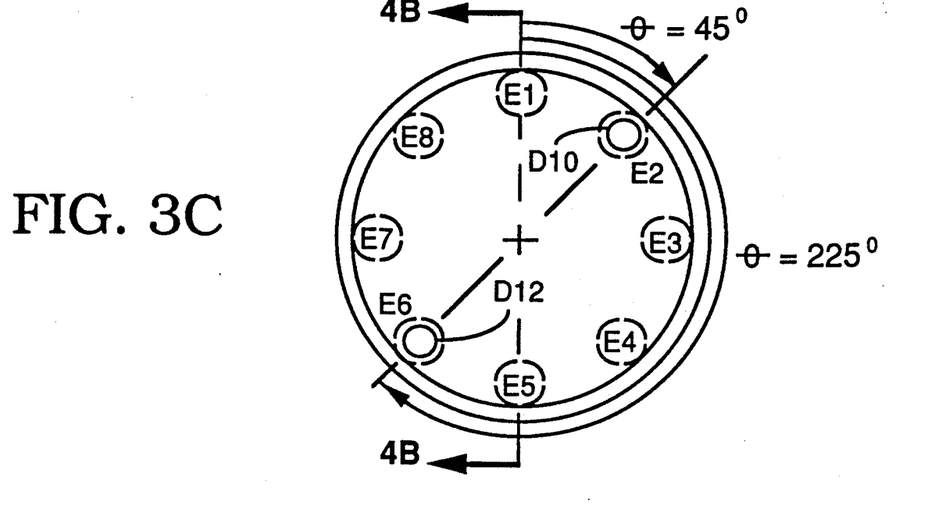

FIGS. 3A-3C illustrate more clearly the facing registration of the rotatable and stationary members, and particularly of the optical detectors D10, D12 relative to the optical emitters E1-E8 previously described in FIG. 1. FIG. 3A depicts the detectors D10, D12 at a phase angle $\theta$ of 0° relative to the emitters E1 and E5, which corresponds to a relationship of 0° for the rotation of the rotatable member 20 relative to the stationary member 30. At $\theta = 0°$ the detector D10 of channel 1 is in register with the emitter E1, and the detector D12 of channel 2 is in register with the emitter E5. In such a rotational position, at least the emitters E1 and E5 are turned on by their respective switches 40, whereby channel 1 and channel 2 inputs on lines 48 are supplied to the emitters E1 and E5. They are converted to light signals and then re-converted back to channel 1 and 2 electrical signals by the detectors D10 and D12, and are recorded on tape via the record heads 12 of FIG. 1. In FIG. 3B, the rotatable member 20 and thus detectors D10 and D12, have rotated to $\theta = 22\frac{1}{2}°$ and emitters E1, E2 and E5, E6 are turned on to allow them to transmit the channel 1 and 2 signals, respectively. At this point, the detector D10 receives half of the signal from each of the emitters E1, E2, and detector D12 receives half from each emitter E5, E6. In FIG. 3C, the member 20 has rotated 45° and emitters E2, E6 are turned on by their respective switches 40. The detectors D10 and D12 thus are now receiving their respective channel 1 and 2 signals primarily from emitters E2, E6, respectively. The process continues as the rotatable member 20 continues to rotate, with the switches 40 enabling and disabling the emitters in sync with the rotation of rotatable member 20, to insure that the stationary emitters which are in facing registration with the rotating detectors are turned on, thereby transmitting the signals continuously through the present optical coupler.

In a multiple channel configuration, it may be preferable to include a ring-like circular light shield or shields secured for example, between the circle of emitters E1-E8 and detectors D1-D8, and inside the detectors D1-D8, of FIGS. 1, 2. Such a shield is depicted in dashed lines at numeral 58 in FIG. 3B, and can be used on either the rotatable or stationary members. The shield also may be included adjacent the detectors of a single channel configuration to prevent excessive or stray light reflections, to thus enhance the efficiency of light detection.

In a more sophisticated and practical operation, three emitters are generally turned on at one time by the respective switches 40 to thereby bracket the detector with the light signal representative of the input electrical signal. Thus, for example, at $\theta=0°$ phase (FIG. 3A), emitters E8, E1 and E2 (as well as E4, E5, E6 for channel 2) are turned on, while at $\theta=22\frac{1}{2}°$, emitter E8 is being turned off, and emitter E3 is being turned on along with the emitters E1, E2. At 45°, the emitter E8 is fully off, and emitter E3 is fully enabled along with E1 and E2.

FIG. 4A is cross-section of the circular member configuration of FIG. 3A taken along the section line 4A—4A, and depicting the axial annular gap 32 between the rotating detectors D10, D12 and the facing emitters E1-E8 of the stationary member 30, when $\theta=0°$. FIG. 4B depicts the cross-section taken along section line 4B—4B of FIG. 3C when the angle $\theta=45°$. As previously mentioned, the lens means illustrated in FIGS. 7, 8 may be employed in the embodiments of FIGS. 1-4.

Figure 5A:
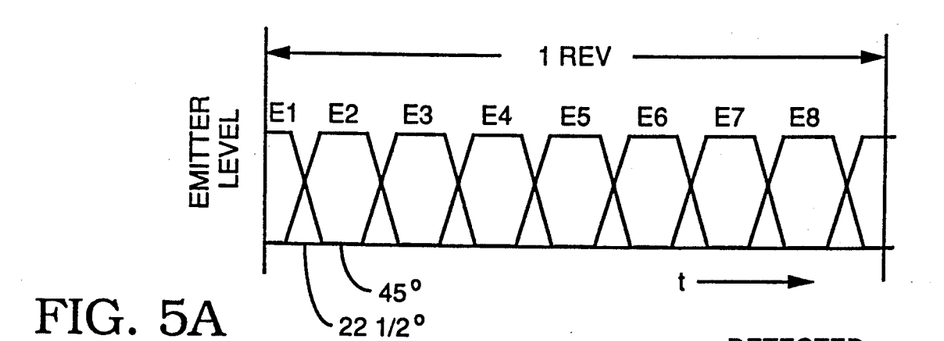
FIGS. 5A, 5B, are charts of waveforms of the emitter levels and the detector outputs, respectively, during one revolution of the rotatable member, for the two channel embodiment of FIGS. 3 and 4.
Figure 5B:
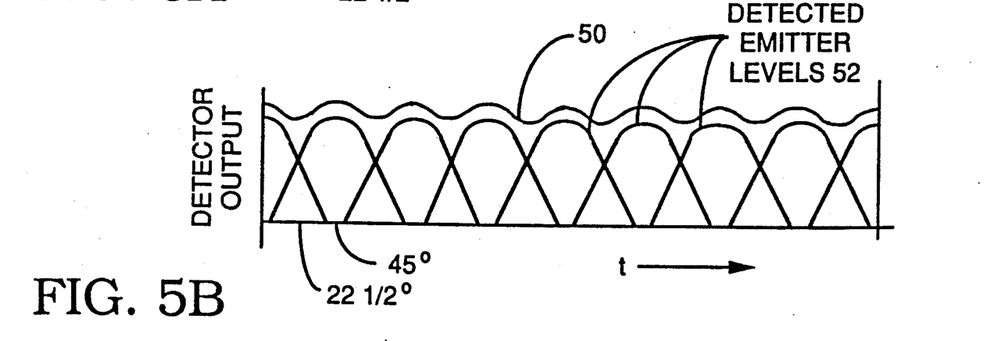

As shown in FIG. 5A, light emitters E1-E8, such as the laser diodes of previous mention, have very fast rise and fall times with relatively flat response while enabled, and are consecutively turned on and off to provide the overlapping waveform depicted as the detectors rotate through the circle of emitters. As shown in FIG. 5B, the detector generates a waveform 50 which theoretically is a DC signal, but which in practice may include a small ripple component. The emitter levels detected by the detectors generally resemble sinewaves as illustrated at 52. Thus as depicted in FIG. 5A, at $\theta=22\frac{1}{2}°$, the detector D10 of channel 1 receives equal mounts of the light signal from emitters E1 and E2. As rotation continues, the detector D10 begins to detect the light signal from emitter E3, until at $\theta=45°$ the emitter E2 supplies the main light signal level with some signal being supplied by emitters E1 and E3. The relative scanning process continues throughout each rotation for each of channels 1 and 2.

Figure 6:
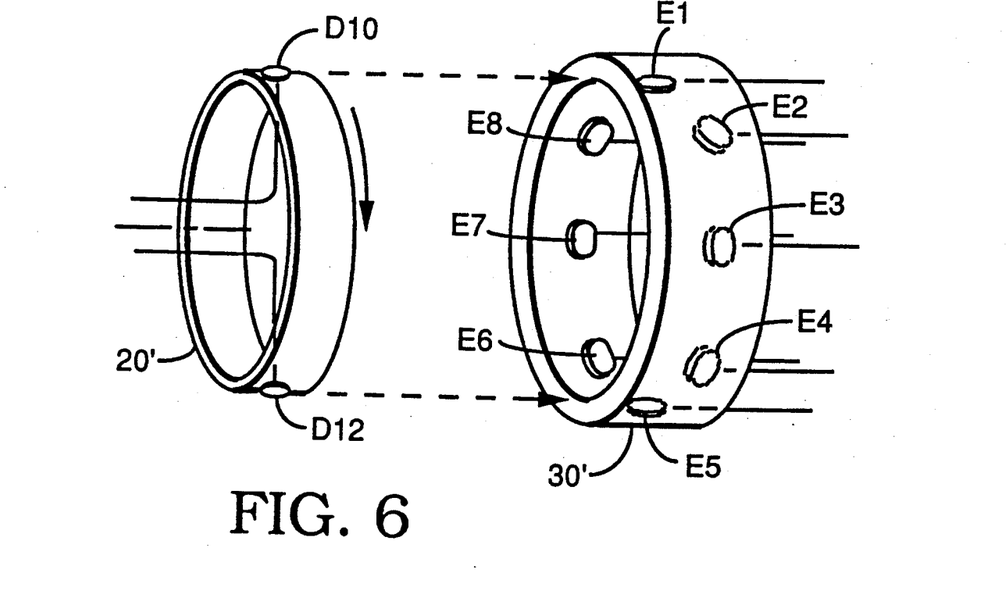
FIG. 6 is a perspective view of another alternative embodiment employing a cylindrical member configuration rather than the circular member configuration of FIGS. 1-4.
Figure 7:
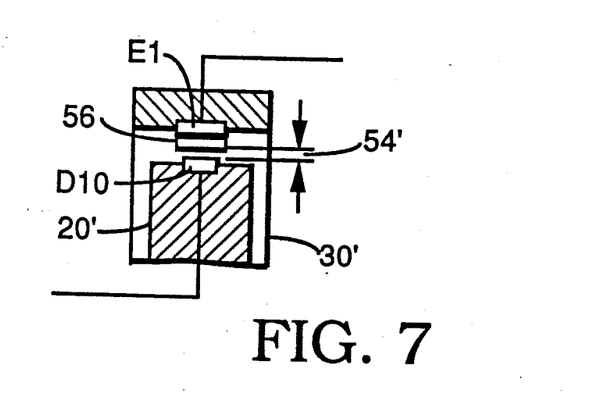
FIGS. 7 and 8 are partial cross-sectional views of the cylindrical member configuration of FIG. 6.
Figure 8:
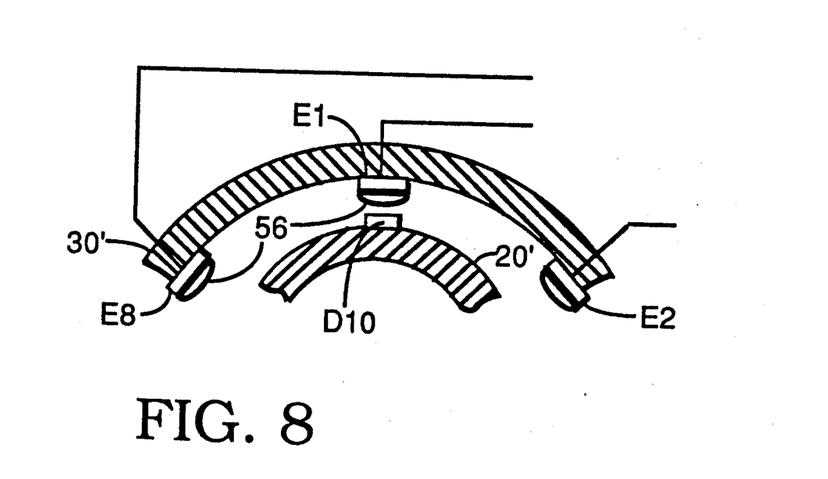

FIG. 6 illustrates an alternate configuration contemplated by the invention, wherein the gap between the rotating and stationary members is a cylindrical annulus. A rotating member 20' includes a disk member having an outer cylindrical surface upon which are secured two (or more) diametrically opposed optical detectors D10, D12. A stationary member 30' includes a ring member having an inner cylindrical surface upon which are secured eight (or more) evenly spaced optical emitters E1-E8. The rotating member 20' is concentrically supported for rotation within the stationary member 30', thereby defining an annular gap 54 between the facing detectors and emitters (FIG. 7). In this particular embodiment, a cylindrical lens 56 is included attached to, or otherwise secured in front of, each emitter E1-E8 secured to the stationary member 30', as depicted by way of example only, in FIGS. 7 and 8. The cylindrical lenses 56 may be employed as necessary to further spread and/or direct the light from the emitters to the detectors, to allow the detectors to more efficiently collect the light. Obviously the cylindrical lenses also may be used in the circular embodiments of FIGS. 1-4 to perform a similar function, as previously mentioned.

Figure 9:
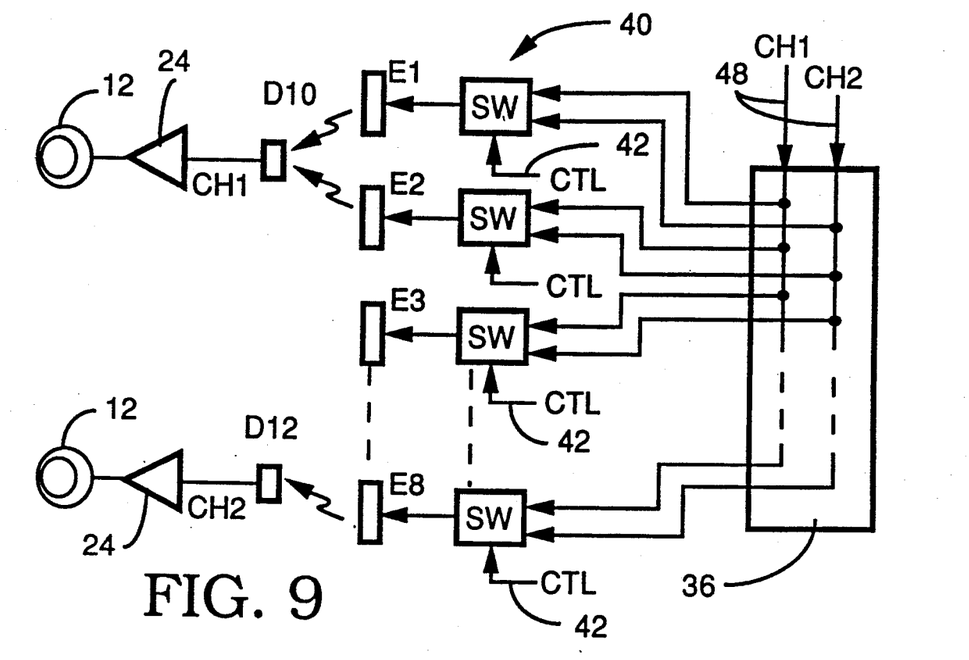
FIGS. 9 and 10 are schematic diagrams exemplifying respective implementations of the circuits of FIGS. 1 and 2, respectively.

FIG. 9 depicts in schematic an example of the circuit for the apparatus of FIG. 1, wherein signals are supplied to channels 1 and 2 via the inputs 48 for transmission to the heads 12, via the invention optical coupler. Like components are similarly numbered. As depicted, the matrix circuit 36 includes channels 1 and 2, which are connected in turn to each of the switches 40, whereby either the channel 1 or 2 signal may be directed by the switches 40, to the respective optical emitters E1-E8, as desired. The optical detectors, D10, D12, which are rotating with the heads 12, thus are followed by the electronically rotating emitters D1-E8, to generate two electrical output signals on channels 1 and 2 corresponding to the two heads 12. In accordance with the invention, the input signals on channels 1 and 2 are converted to light signals indicative thereof, by the stationary but electronically rotating optical emitters E1-E8, and are detected and converted back to the electrical signals of channels 1 and 2 via the physically rotating optical detectors D10, D12.

Figure 10:
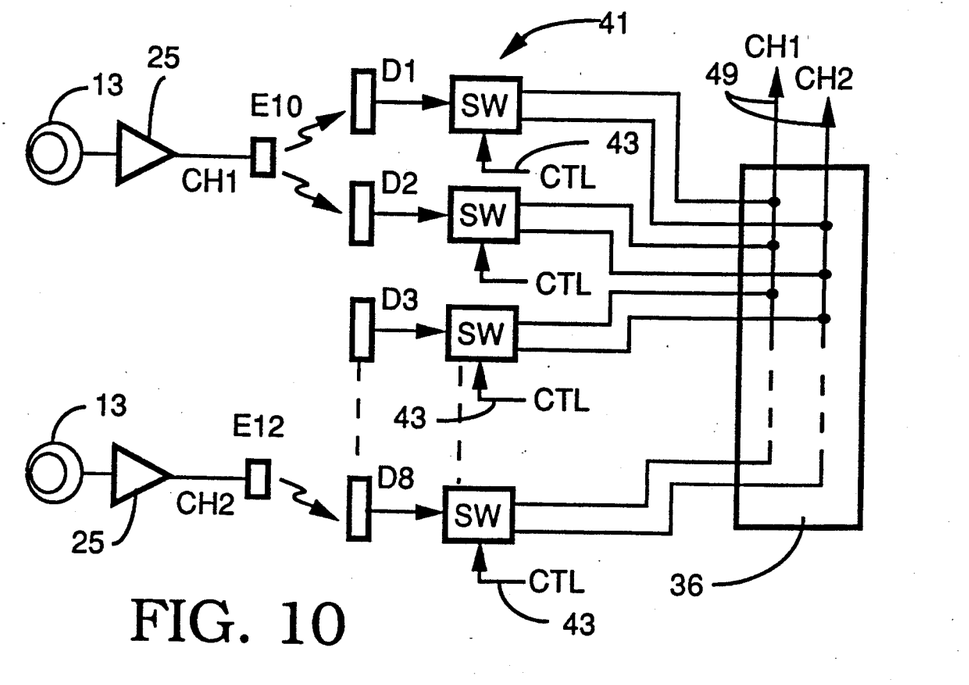

FIG. 10 depicts an example of a circuit for the apparatus of FIG. 2, wherein signals are read by the playback heads 13 and are supplied to the channels 1 and 2 of the matrix circuit 36, via the invention optical coupler. Again, like components of FIGS. 1, 2, 9 and 10 are similarly numbered. The reproduced signals are amplified by amplifiers 25 and are converted to light signals via the respective rotating emitters E10, E12. The light signals are detected by successively enabling the detectors D1-D8 by selectively enabling and disabling respective switches 41 coupled to the detectors, as previously described for switches 40 in FIG. 9. The two output signals are supplied on the lines 49 corresponding to channels 1 and 2, wherein the output signals are essentially the original reproduced signals from the heads 13.

The optical coupler arrangements depicted herein may be used to transmit either analog or digital signals from a rotating scanner to stationary electronics, and vice versa. In general, the signal modulates the intensity of the light emitted by the laser diode emitters. In an analog system, the emitters are biased to a selected steady state light output, and the analog signal then modulates the steady state output. In a digital system, the emitters are biased close to their forward conducting state which, in a laser diode, is the lasing threshold. A digital "1" then drives the diode into a lasing state with a large, readily detectable, light output, while a "0" does not.

I claim:

1. Apparatus for bi-directionally transmitting, between a stationary member and a rotatable member, at least one electrical signal along at least one channel, said transmitting being between optical means having at least one optical emitter for generating an optical signal and at least one optical detector for re-generating the electrical signal in response to the optical signal, comprising:

an optical emitter disposed on a preselected circumference of either the stationary member or the rotatable member;

an optical detector concentrically disposed on the other of the stationary member of the rotatable member along a matching circumference and in facing registration with the optical emitter, with a preselected gap therebetween; and switching means responsive to the rotatable member for switching the optical means on the stationary member in sync with rotation of the rotatable member to supply the electrical signal.

2. The apparatus of claim 1 having a plurality of channels, further including:
   a plurality of optical emitters spaced along the preselected circumference of the stationary or rotatable member; and
   a plurality of optical detectors concentrically spaced along the matching circumference of the other of the stationary or rotatable member in facing registration with the plurality of optical emitters.

3. The apparatus of claim 2 wherein rotation of said rotatable member about an axis moves the optical means thereon past the concentrically facing optical means of the stationary member with the preselected gap therebetween, and said switching means electronically enables and disables successive ones of the optical means of the stationary member in sync with the rotation of the rotatable member.

4. The apparatus of claim 3 wherein the plurality of optical emitters are coaxially secured to the rotatable member along the preselected circumference thereon, and the plurality of optical detectors are secured to the stationary member along the matching circumference and facing the plurality of optical emitters on the rotatable member.

5. The apparatus of claim 4 including at least two electrical signals in two channels, and including at least two optical emitters diametrically secured to the rotatable member about an axis of rotation, for generating respective optical signals indicative of the two channels of electrical signals.

6. The apparatus of claim 5 further including a plurality of optical detectors greater than two secured about the matching circumference of the stationary member in coaxial alignment with the optical emitters; and said switching means includes electronic switches disposed to sequentially enable and disable each optical detector.

7. The apparatus of claim 4 wherein selected optical of the plurality of optical detectors, which are in selected facing registration with a respective optical emitter, are enabled in sync with the rotation of said respective optical emitters.

8. The apparatus of claim 3 wherein the plurality of optical detectors are coaxially secured to the rotatable member along the preselected circumference thereon, and the plurality of optical emitters are secured to the stationary member along the matching circumference and in coaxial alignment facing the optical detectors on the rotatable member.

9. The apparatus of claim 8 including at least two electrical signals in respective channels, wherein the optical detectors include at least two optical detectors, diametrically secured to the rotatable member about an axis of rotation, for receiving the respective optical signals indicative of the respective channels of electrical signals.

10. The apparatus of claim 9 including a plurality of optical emitters greater than two secured about the matching circumference of the stationary member in coaxial alignment with the optical detectors; and said switching means includes electronic switches disposed to selectively enable and disable each optical emitter.

11. The apparatus of claim 3 including:
   timing means, responsive to rotation of the rotatable member, for supplying a control signal which selectively enables the switching means in sync with the rotation.

12. The apparatus of claim 11 wherein the timing means includes:
   means for determining the rotation of the rotatable member; and
   switching control means, responsive to the determining means, for selectively enabling the selected optical means on the stationary member in sync with the rotation.

13. The apparatus of claim 11 further including:
   input/output means, coupled to the switching means, for supplying to, or receiving from, the optical means said at least one electrical signal along said at least one channel.

14. The apparatus of claim 3 wherein the rotatable and stationary members are circular with facing flat surfaces upon which the optical emitters and detectors are disposed, said preselected gap being a circular axial gap therebetween.

15. The apparatus of claim 3 wherein the rotatable and stationary members are cylindrical with a concentric cylindrical surface facing a surrounding concentric cylindrical bore surface upon which surfaces the optical emitters and detectors are disposed, said preselected gap being a cylindrically annular gap therebetween.

16. Apparatus for bidirectionally transmitting a data signal along one or more data channels, from a stationary member to a rotatable member and vice versa, comprising:
   a plurality of light emitter means disposed in respective one or more data channels and secured in preselected circular configuration on the stationary member;
   a plurality of lines extending from the plurality of light emitter means and along said one or more data channels;
   light detector means secured along a circumference of the rotatable member, which circumference is the same as that of the preselected circular configuration on the stationary member, wherein the light detector means is coaxial with, and axially spaced from, the light emitter means to define therebetween a preselected gap;
   timing means, responsive to the rotatable member, for generating a sync signal indicative of the rotation; and
   switching means disposed in the plurality of lines, and responsive to the sync signal, for selectively enabling selected ones of the light emitter means in sync with the rotation of the light detector means.

17. Apparatus for bidirectionally transmitting a data signal along one or more data channels, from a rotatable member to a stationary member, and vice versa, comprising:
   a plurality of light detector means disposed in respective one or more data channels and secured in preselected circular configuration on the stationary member;
   a plurality of lines extending from the plurality of light detector means and along said one or more data channels;

light emitter means secured along a circumference of the rotatable member, which circumference is the same as that of the preselected circular configuration on the stationary member, wherein the light emitter means is coaxial with, and axially spaced from, the light detector means to define therebetween a preselected gap;

timing means, responsive to the rotatable member, for generating a sync signal indicative of the rotation; and switching means disposed in the plurality of lines, and responsive to the sync signal, for selectively enabling selected ones of the light detector means in sync with the rotation of the light emitter means.

* * * * *